Jan. 21, 1941.  M. WARE  2,229,153
TRANSMISSION
Filed Dec. 11, 1939   2 Sheets-Sheet 1
Fig. 1.
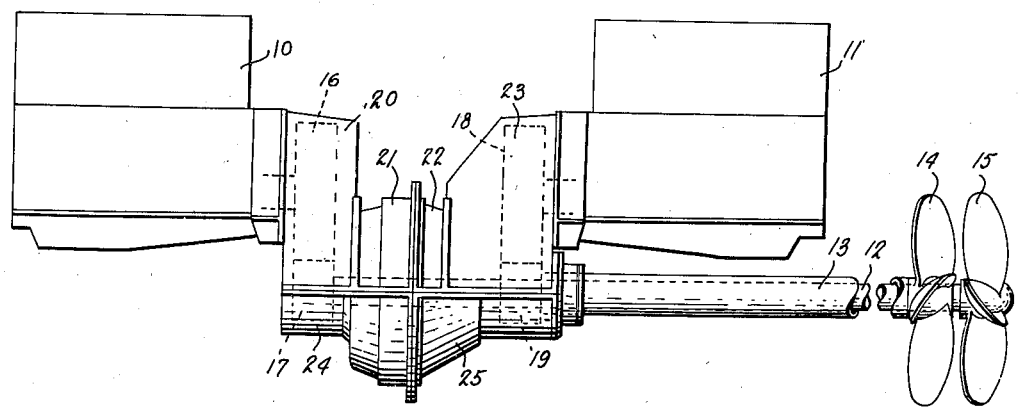
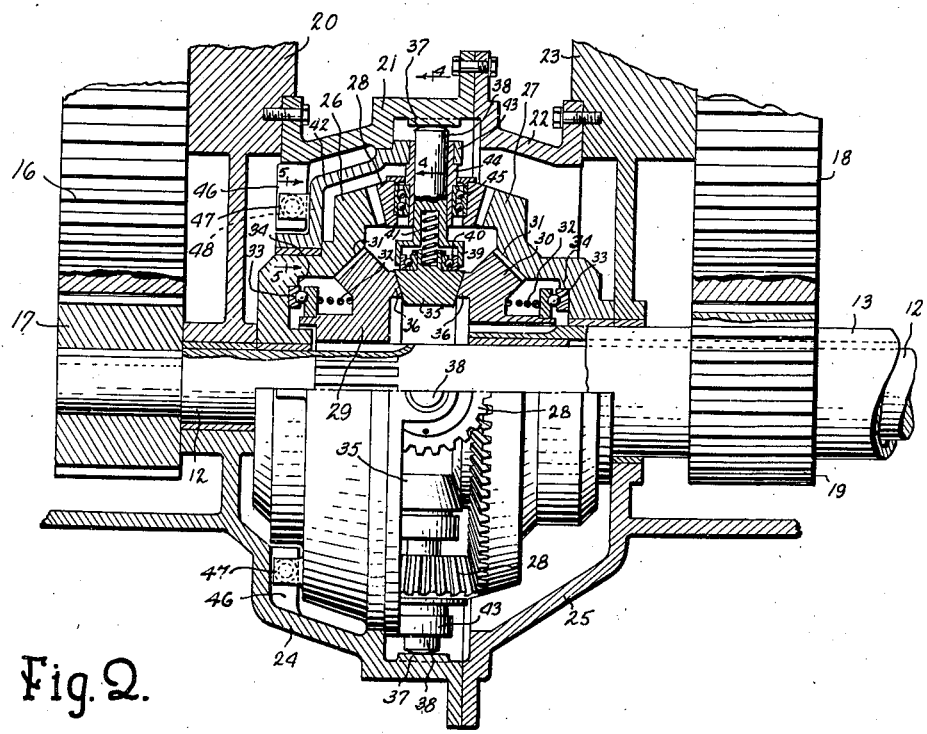
Fig. 2.
INVENTOR.
Marsden Ware
BY
*Sibbetts & Hart*
ATTORNEYS Jan. 21, 1941.　　　M. WARE　　　2,229,153
TRANSMISSION
Filed Dec. 11, 1939　　　2 Sheets-Sheet 2

INVENTOR.
Marsden Ware
BY
ATTORNEYS

Patented Jan. 21, 1941

2,229,153

UNITED STATES PATENT OFFICE 2,229,153

TRANSMISSION

Marsden Ware, Huntington Woods, Mich., assignor to Packard Motor Car Company, Detroit, Mich., a corporation of Michigan Application December 11, 1939, Serial No. 308,604

14 Claims. (Cl. 74—389)

This invention relates to dual drive mechanisms and more particularly to devices for synchronizing such mechanisms.

In the operation of dual drive mechanisms various conditions are contributory to different relative rotational speeds. When the drive mechanisms rotate at relatively different speeds and are out of phase, vibrations set up a total disturbance which is much greater than the total of similar vibrational disturbances present when the mechanisms are rotating in proper phase. This out-of-phase vibrational disturbance is particularly noticeable with mechanisms for driving dual propellers operating at high speeds.

It is an object of this invention to provide a synchronizing device for dual drive mechanisms so that a similar speed of rotation and proper phase will be maintained in the higher speed range.

Another object of the invention is to provide a torque responsive synchronizing device for dual drive mechanisms that will interconnect the mechanisms under certain operating conditions and will disconnect the mechanisms under other operating conditions.

A further object of the invention is to provide torque controlled means for automatically synchronizing two drive mechanisms that can be adjusted to vary the range of effectiveness.

Other objects of the invention will appear from the following description taken in connection with the drawings, which form a part of this specification, and in which:

Fig. 1 is a side elevational view of a pair of propeller drive mechanisms having a drive synchronizing device associated therewith;

Fig. 2 is a fragmentary vertical sectional view showing the synchronizing device in effective relation with the two drive mechanisms;

Figure 3:
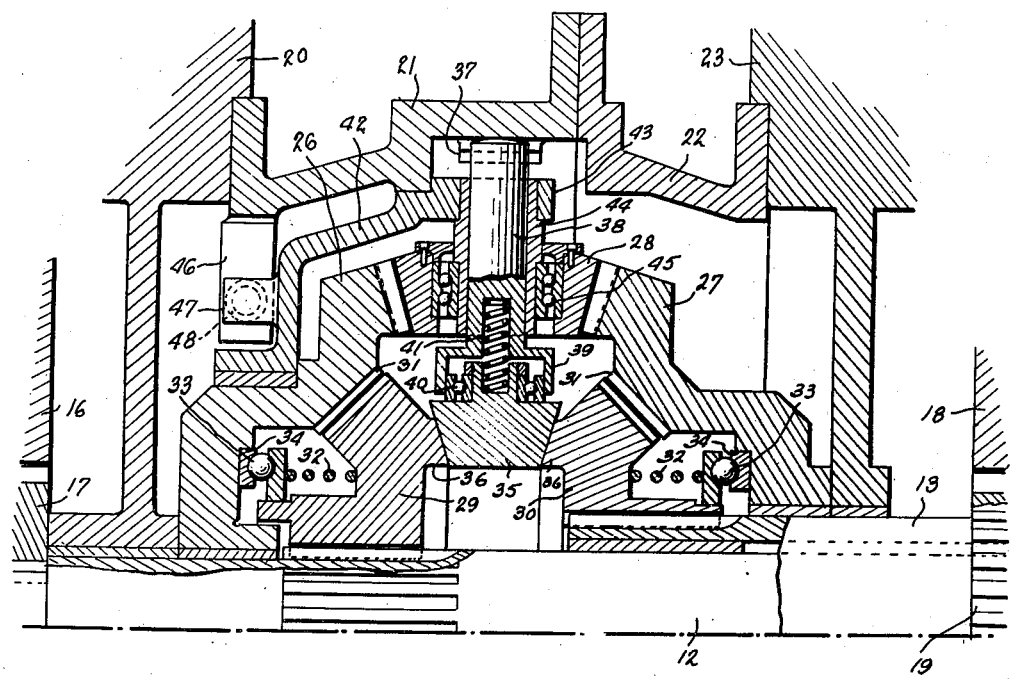
Fig. 3 is a fragmentary enlarged view of the structure shown in Fig. 2, with the synchronizing device out of effective relation.
Figure 5:
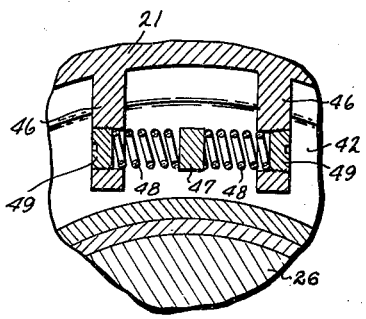
Fig. 5 is a sectional view of the synchronizing device taken on line 5—5 of Fig. 2.
Figure 4:
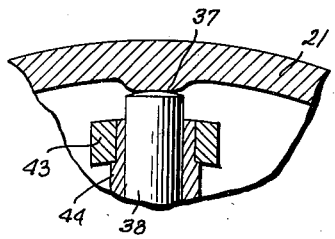
Fig. 4 is a sectional view of the synchronizer control device taken on line 4—4 of Fig. 2.

Referring now to the drawings by character of reference, 10 and 11 indicate two similar internal combustion engines arranged to actuate two drive mechanisms. In the present instance these drive mechanisms are in the form of telescoped shafts 12 and 13 carrying at their ends propellers 14 and 15. The engine 10 drives shaft 12 through means of meshing gears 16 and 17 suitably driven from the crankshaft and engine 11 drives shaft 13 through meshing gears 18 and 19 driven by the crankshaft in a suitable manner. The engines are arranged endwise so that their driving ends are adjacent each other and the mechanism for rotating the drive shafts is enclosed by upper housing sections 20, 21, 22 and 23 that are fixed together and to the ends of the engines. These upper housing sections are closed by bottom ends 24 and 25. With this arrangement of the engines the propeller shafts and the propellers fixed thereon will be rotated in opposite directions so that the propeller blades of the propellers are in opposite angular relation in order that the power produced thereby will be exerted to propel a device such as a boat or an airplane in the same direction.

Internal combustion engines even though similar do not always function to produce the same speed of rotation of propeller shafts and desired phase and, as a result, the vibrational disturbances arising from the operation of the two drive mechanisms multiply vibratory conditions. This is particularly true when the propellers are in opposed and concentric relation as they are in the illustrated embodiment of the invention. It is the purpose of this invention to provide synchronizing mechanism for the drive mechanisms so that they will be rotated at the same speed and in desired phase under certain engine operating conditions. This result is accomplished by synchronizing mechanism which will now be described.

Intermeshing gearing is rotatably mounted upon the shafts and is suitably engaged or disengaged with the shafts under varying engine operating conditions. A gear 26 is rotatably mounted on shaft 12 and a gear 27 is rotatably mounted upon shaft 13 and arranged between and meshing with such gears is a plurality of rotatably mounted pinions 28. Intermediate the gears 26 and 27 is arranged a pair of shiftable clutches 29 and 30, the clutch 29 being slidably splined on shaft 12 and the clutch 30 being slidably splined on shaft 13. On the inner surface of gears 26 and 27 are formed clutch teeth 31 with which the shiftable clutches are arranged to be engaged.

The clutches 29 and 30 are urged in a direction away from the clutch teeth on the gears 26 and 27 by coil springs 32 each having one end bearing against a clutch and the opposite end engaging a ball bearing 33 carried by the adjacent gear. The gears are formed with flanges 34 providing a slidable support for the inner races of the bearings 33.

The position of the slidable clutches is controlled by actuator means in the form of cone rollers 35 that extend between and bear against angular surfaces formed on the flange portion 36 of gears 26 and 27. These rollers are arranged so that they can move in an axial direction when sufficient force is exerted thereagainst to overcome the pressure of springs 32 to thereby engage the clutches with the clutch teeth on the gears.

The axial position of the cone rollers is determined by cam means. In such means a stationary member, in this instance the casing 21, is formed with a plurality of inwardly extending cam segments 37 with which stems 38 are arranged in cooperative relation. These stems are formed with flared inner ends 39 each carrying a bearing 40 in which the cone rollers are mounted for rotation and the rollers and bearings have a limited movement in an axial direction in such flared ends. The stems 38 are recessed to receive coil springs 41 that bear against and urge the cone rollers into engagement with the clutches 29 and 30 but these springs 41 do not exert sufficient pressure to overcome the clutch disengaging pressure of springs 32. When the stems ride on the cam segments 37 of the stationary member they will be positioned radially of the casing to hold the cone rollers in a position forcing the clutches 29 and 30 into engaged relation with the teeth 31 on the gears 26 and 27. The clutches when thus engaged with the gears will lock the gears 26 and 27 to shafts 12 and 13 and as the pinions intermesh with the gears the shafts 12 and 13 will be rotated at the same speed regardless of engine operating conditions. Rotation of the shafts will of course be in opposite directions.

The position of the stems 38 of the clutch control means is governed automatically and preferably by means responsive to a predetermined torque differential developed in the operation of shafts 12 and 13. In such torque controlled mechanism a spider 42 is rotatably mounted on a hub portion of gear 26 and has apertured arms 43 extending from the periphery through which the stems 38 project. Sleeves 44 are carried by the arms and provide guides or bushings for the stems and also carriers for ball bearings 45 on which pinions 28 are mounted. Thus the spider 42 carries the idler pinions 28 and the clutch control mechanism.

The housing section 21 is formed with pairs of spaced internal flanges 46 between each pair of which an arm 47 formed on the spider extends. A pair of coil springs 48 bear against opposite sides of each arm 47 and seat against adjustable portions 49 of each pair of flanges 46. These adjustable portions of the flanges are preferably arranged so that they can be screwed in directions to increase or reduce the pressure applied by the springs 48 against the arms 47. The springs 48 of each pair are balanced. Normally these pairs of balanced springs maintain the arms 47 in positions maintaining the spider in position such that the stems 38 will bear against the cam segments 37 of the housing 21 and will thus position the cone rollers so that the clutches 29 and 30 will engage with the teeth on gears 26 and 27. When there is such engagement of the clutches and gears the shafts 12 and 13 will be driven at the same speed, as previously described, and the torque of such shafts will be transmitted through the clutches to the gears 26 and 27 and to the pinions 28. When the torque differential as developed by the two shafts and transmitted to the pinions 28, is sufficient to overcome the balanced pressures of the pairs of springs 48 in one or the other direction of rotation, depending upon which shaft is exerting the greater torque, then the spider 42 will be rotated slightly and the stems 38 carried thereby will ride off of the cam segment 37 so that the cone rollers 35 can be moved axially from the clutch members 29 and 30 by the action of springs 32 sufficiently to permit disengagement of the clutches with the teeth on gears 26 and 27. When the clutches are disengaged from the gears then the shafts 12 and 13 will be independently driven by their power plants. The torque differential required to overcome the pressure of the pairs of springs 48 can of course be changed to suit different conditions by the adjustment of movable portions 49 of the flanges 46.

With the synchronizing mechanism herein described the propellers will be driven at the same speed of rotation by independent power plants and they will remain in desired phase during certain conditions of engine operation. When one of the engines falters or is stopped for any cause then the synchronizing mechanism is disconnected so that the other engine will not be compelled to actuate the dead or faltering engine. The synchronizing mechanism thus decreases undesirable vibrational conditions in the power plant under certain operating conditions and increases the power development under other operating conditions of the power plants. It will be observed that these results are accomplished automatically.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. Dual drive mechanism comprising a pair of independently driven members, mechanism including shiftable clutch means for interconnecting the pair of members to cause their rotation at the same speed, and means responsive to torque differential of said members controlling the shifting movement of said clutch means.

2. Dual drive mechanism comprising a pair of separately driven members, mechanism including clutch means shiftable to interconnect said members so that they will rotate at the same speed, and automatic means operable to control the shifting of said clutch means, said automatic means being responsive to a torque differential of said members.

3. Dual drive mechanism comprising a pair of independently driven shafts, mechanism operable to connect said shafts for similar rotation including clutch means, and means responsive to a predetermined torque differential of the shafts for shifting said clutch means to disengage said mechanism.

4. Dual drive mechanism comprising a pair of independently driven shafts, mechanism operable to drivingly connect said shafts for similar rotational speed including clutch means, means normally engaging said clutch means, and means responsive to a torque differential of said shafts to disengage said clutch means.

5. Dual drive mechanism comprising a pair of telescoped propeller shafts driven independently in opposite directions, a pair of gears rotatably mounted one on each shaft, idler gears meshing with said pair of gears, clutch members slidably splined one on each shaft and engageable with the pair of gears, spring means normally disengaging said clutch members from said gears, and cam means operable to engage said clutch members with said gears.

6. Dual drive mechanism comprising a pair of telescoped propeller shafts driven independently in opposite directions, a pair of gears rotatably mounted one on each shaft, pinions meshing with said gears, a pair of clutch members slidably splined one on each shaft and engageable with the gear on the same shaft, spring means normally disengaging said clutch members from said gears, and rotatably mounted cones operable to engage said clutch members with said gears.

7. Dual drive mechanism comprising a pair of telescoped propeller shafts driven independently in opposite directions, a pair of gears having clutch teeth and rotatably mounted one on each shaft, pinions meshing with both said gears, a pair of clutch members slidably splined one on each shaft, spring means urging said clutch members away from the clutch teeth of said gears, a rotatably mounted cone member bearing against said clutch members and operable to engage them with the clutch teeth of said gears, and cam means controlling the movement of said cone member to engage said clutch members.

8. Dual drive mechanism comprising a pair of telescoped propeller shafts driven independently in opposite directions, a pair of gears having clutch teeth and rotatably mounted one on each shaft, pinions meshing with both said gears, clutch members slidably splined one on each shaft, spring means urging said clutch members away from the clutch teeth of said gears, a rotatably mounted cone member bearing against said clutch members and movable axially to shift said clutch members into engagement with the clutch teeth of said gears, cam means controlling axial movement of said cone member, and means responsive to the torque differential of said shafts controlling said cam means.

9. In a dual drive mechanism having a pair of independently driven propeller shafts, synchronizer mechanism for said shafts comprising meshed gearing including pinion gears, clutch means for drivingly connecting said gearing with said shafts, clutch actuator means, and means for controlling said clutch actuator means in response to torque differential in the shafts, said torque responsive means being adjustable to vary the torque differential range in which it responds.

10. In a dual drive mechanism having a pair of independently driven propeller shafts, synchronizer mechanism for said shafts comprising a pair of gears rotatably mounted one on each shaft, rotatably mounted pinion gears meshing with said pair of gears, a rotatably mounted spider, pinion gear mountings carried by said spider, clutch means slidably splined on said shafts and engageable with said pair of gears, and means responsive to a torque differential of said shafts operative to shift said clutch means.

11. In a dual drive mechanism having a pair of independently driven propeller shafts, synchronizer mechanism for said shafts comprising a pair of gears rotatably mounted one on each shaft, rotatably mounted pinion gears meshing with said pair of gears, a spider rotatably mounted on one of said gears, arms projecting from said spider, pinion gear mounting means carried by said arms, a pair of clutches slidably splined one on each shaft and engageable with the gear on such shaft, a casing surrounding said spider, pairs of spaced flanges on said casing, flanges on said spider extending one intermediate each pair of said casing flanges, balanced coil springs seated against said casing flanges and engaging said spider flanges, a roller operable to control shifting of said clutches, and cam actuator means for said roller carried by and under control of said spider, said spider being movable rotationally against the pressure of said balanced springs by a predetermined torque differential developed in said pinion gears when the clutches are engaged to control the cam actuator.

12. In a dual drive mechanism having a pair of independently driven propeller shafts, synchronizer mechanism for said shafts comprising a pair of gears rotatably mounted one on each shaft, rotatably mounted pinion gears each meshing with said pair of gears, a pair of clutches slidably splined one on each shaft and engageable with said gears, a roller shiftable to control said clutches, a fixed cam member, actuator means cooperating with said cam member and controlling the position of said roller with said clutches, and means responsive to a torque differential of said shafts for shifting said actuator means with respect to said cam member.

13. In a dual drive mechanism having a pair of independently driven propeller shafts, synchronizer mechanism comprising a pair of gears rotatably mounted one on each shaft, pinion gears each meshing with said pair of gears, a pair of clutches slidably splined one on each shaft and engageable with said gears, a spider mounted on one of said gears for limited rotational movement, elastic means restraining rotational movement of said spider from a predetermined position, sleeves carried by said spider, stems axially movable in said sleeves, fixed cam means in the path of movement of one of end of said stems, and clutch actuator means responsive to the axial movement of said stems as determined by said cam means in response to rotational movement of said spider, said spider being responsive to torque differential developed in said pinion gears.

14. In a dual drive mechanism having a pair of propeller shafts driven independently in opposite directions, a pair of gears rotatably mounted one on each shaft, pinion gears each meshing with said pair of gears, a pair of clutches slidably splined one on each shaft and engageable with the pair of gears, spring means urging said clutches out of engagement with said pair of gears, a spider mounted for limited rotation on one of said pair of gears, sleeves carried by said spider, bearings on said sleeves for said pinions, stems projecting through said sleeves, fixed cam means for regulating the axial position of said stems in said sleeves, rollers engaging said clutches and controlling actuation thereof to engage and disengage said pair of gears, bearings carried by the stems engaged by said rollers, and balanced springs resisting rotational movement of said spider.

MARSDEN WARE.

CERTIFICATE OF CORRECTION.

Patent No. 2,229,153.   January 21, 1941.

MARSDEN WARE.

It is hereby certified that error appears in the printed specification of the above numbered patent requiring correction as follows: Page 3, second column, line 44, claim 13, for the words "of one of end of" read --of one end of--; and that the said Letters Patent should be read with this correction therein that the same may conform to the record of the case in the Patent Office.

Signed and sealed this 9th day of December, A. D. 1941.

(Seal)
Henry Van Arsdale,
Acting Commissioner of Patents.